BALANCED MIXER

Filed March 29, 1946

INVENTOR.
WILLIAM D. HOPE
BY M. A. Hayes
ATTORNEY

United States Patent Office 2,754,416

Patented July 10, 1956

2,754,416

BALANCED MIXER

William D. Hope, La Grange, Ill., assignor, by mesne assignments, to the United States of America as represented by the Secretary of the Navy Application March 29, 1946, Serial No. 658,160

2 Claims. (Cl. 250—20)

This invention relates to an electrical signal mixer, and more particularly to a simplified broadband balanced mixer employing crystals.

The use of balanced mixers is desirable, if not imperative, in superheterodyne applications which require a high degree of amplification, because of the fact that random electrical noise contributed by the local beating oscillator can be rejected easily in the mixer output.

Since a balanced mixer is inherently a full-wave rectifier, the power output realized is three decibels above that of a conventional single-ended, or half-wave rectifier. In applications which require low degrees of distortion of the output, the use of a balanced mixer is further advantageous because the second harmonic distortion is theoretically balanced out or, in a practical circuit, reduced below that value would be obtained with a conventional single-ended mixer.

One conventional type of balanced mixer for microwave applications comprises a radio frequency bridge having elements composed of series and parallel connected sections of wave guide transmission line. Such a mixer is satisfactory for many applications, but it is relatively sensitive to variations in operating frequency and is physically bulky.

It is an object of this invention to provide a simplified and compact balanced mixer.

It is another object of this invention to provide a broadband balanced mixer.

These and other objects will be more apparent upon consideration of the following description together with the accompanying drawings, in which.

Figures 1, 2, 3:
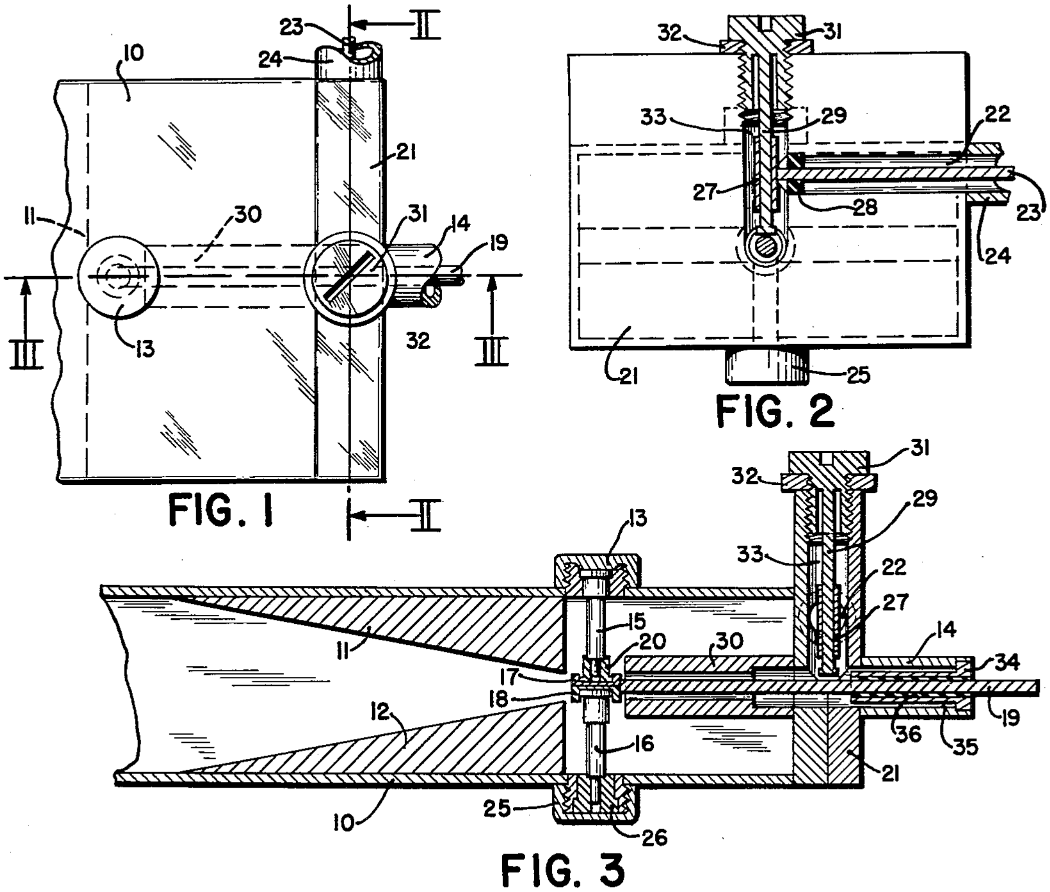
Fig. 1 is a top view of an embodiment of the present invention.
Fig. 2 is a sectional view along line II—II of Fig. 1.
Fig. 3 is a sectional view along line III—III of Fig. 1.

Referring to the drawings, a wave guide transmission line 10, having a substantially rectangular cross section, is terminated by a conductive end block 21. Crystal rectifier cartridges 15 and 16, each having dissimilar (probe and flanged cap) conductive end terminals separated by an insulating member, are mounted end to end between the centers of the broad walls of wave guide 10, with the longitudinal axes of the crystals substantially parallel to the narrow walls of wave guide 10 and one-quarter wave length of energy propagated in the wave guide away from block 21. It will be noted that the probe terminal of crystal 15 and the flanged cap terminal of crystal 16 are connected together in a common junction with supporting conductive cups 17 and 18, which are conductively connected to a conductive rod 19. Rod 19 forms the inner conductor, and a conductive tube 30 forms the outer conductor of a coaxial line, which extends through block 21 and across which the beat frequency signal output appears. A conductive crystal cartridge tip receptacle 20 having the same physical dimensions as the cap terminals of the crystal cartridges is disposed between the tip terminal of crystal 15 and supporting cup 17 to provide a physically symmetrical internal structure. Crystals 15 and 16 are secured mechanically and electrically within wave guide 10 by metal screw caps 13 and 25 respectively. A removable metal insert 26 having a central hole to accept the tip terminal of crystal 16 is provided in the assembly of screw cap 25 to permit the insertion of the cap terminal of crystal 16 into wave guide 10.

As shown in Fig. 3, wedges 11 and 12 of conductive material are fixed to opposite inside walls of wave guide 10. These wedges, which provide an impedance matching transformer between crystals 15 and 16 and wave guide 10, extend entirely across the wide walls of wave guide 10 and are one-half wave length long, for energy propagated in wave guide 10. In order to minimize the frequency sensitivity of the transformer, the wide ends of wedges 11 and 12 are positioned as near the crystals as is possible, consistent with sufficient physical separation to prevent electrical contact.

As shown in Fig. 2, a cylindrical opening 22 in end block 21, in combination with a conducting rod 23, forms a coaxial line, which is extended by a conductive tube 24 secured to the end block 21, and to which the output of a local oscillator (not shown) is connected. A sliding contact sleeve 27 is conductively connected to the inner end of rod 23, the latter being supported concentrically within channel 22 by means of an insulating bead 28.

The output of the external local oscillator, connected across the coaxial line formed by rod 23 and tube 24, is impressed upon the crystals through a variable capacitor, one plate of which is rod 19; the other plate being a coupling probe in the form of the upset end of rod 29. Rod 29 is fastened to an adjusting screw 31, the threads of which as shown are engaged in the threaded walls of a second cylindrical opening 33 cut into end block 21. The degree of local oscillator signal coupling is thus adjustable by means of screw 31. Locknut 32, engaged in the threads of screw 31 provides a means for maintaining this adjustment.

Referring again to Fig. 3, a conducting bushing 34, insulatedly separated from rod 19 by a dielectric material 36, forms a filter section in the beat frequency output coaxial line formed by rod 19 and a conductive tube 14. As shown in the drawing, a cylindrical cavity comprising a choke 35 is formed between bushing 34 and tube 14, with the distance between the coupling probe rod 29 and the closed end of choke 35 being substantially one-quarter wave length at the operating frequency of the local oscillator. The shunt capacitance between rod 19 and bushing 34 provides a low impedance shunt path for the local oscillator and signal frequencies and a relatively high shunt impedance at the difference beat frequency.

Figure 4:
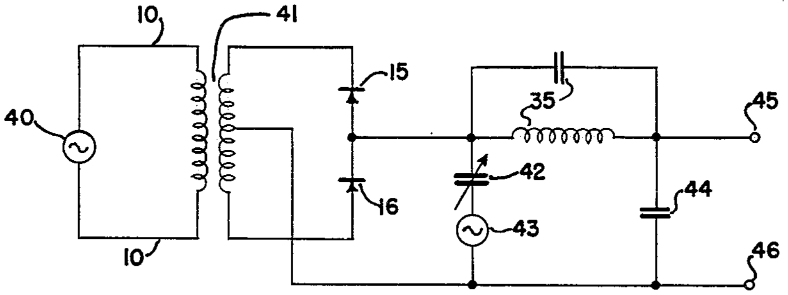
Fig. 4 is an equivalent circuit of the device shown in Figs. 1, 2, and 3.

An equivalent electrical circuit of the invention is shown in Fig. 4. Components common to all drawings are similarly numbered. As can be seen, the output of a signal generator 40 is coupled by means of a transmission line 10 to the primary of transformer 41. In Fig. 3, the equivalent transmission line comprises wave guide 10 and the transformer comprises wedges 11 and 12. Crystals 15 and 16 are connected end to end as full-wave rectifiers across the secondary of transformer 41. The output of a local oscillator 43 is coupled through a variable capacitor 42 to the junction between crystals 15 and 16. The difference frequency, produced in the well known manner by the action of the non-linear crystal impedances through the simultaneous application of two alternating currents, is coupled from the junction between crystals 15 and 16 to terminal 45 through a choke circuit 35 which is parallel-resonant at the operating frequency of the local oscillator 43. A shunt capacitor 44 further attenuates the local oscillator voltage by providing a low impedance path between the beat frequency output terminals 45 and 46 at the frequency of local oscillator 43. The direct current component of the output signal will be zero because of the direct connection between the crystals.

Since certain changes may be made in the above described article and different embodiments of the invention could be made without departing from the scope thereof, it is intended that all matter contained in the above description or shown in the accompanying drawings shall be interpreted as illustrative.

What is claimed is:

1. A broadband balanced mixer comprising, a wave guide having a rectangular cross section, first and second series connected crystal rectifiers, said crystals being disposed end to end between opposite wide walls within said wave guide, a pair of conductive wedges disposed between the input end of said wave guide and said crystals, said wedges extending across said opposite wide walls within said wave guide, a conductive end block closing the end of said wave guide, said block being positioned away from said crystals an odd multiple of quarter wave lengths of the energy being propagated within said wave guide, a first coaxial transmission line extending through said block and into said wave guide, the inner conductor of said first coaxial line being connected to the junction between said crystals, a second coaxial line, said second coaxial line being positioned substantially at right angles to said first coaxial line and coupled capacitively thereto, means including the inner conductor of said second coaxial line for adjusting the capacity of the coupling between said first and said second coaxial lines, a third coaxial transmission line disposed perpendicularly to said second transmission line, a sliding conductive contact sleeve, the inner conductor of said second coaxial line passing through said sleeve, the inner conductor of said third coaxial line extending from said sleeve, insulating means supporting said last mentioned inner conductor, and a conductive plug disposed within said first coaxial line and insulatedly separated from the inner conductor thereof, a cylindrical cavity between said plug and the outer conductor of said first coaxial line providing a choke operative to prevent currents of predetermined frequencies from flowing in said first coaxial line.

2. A balanced mixer comprising, a wave guide transmission line having a rectangular cross section, first and second series connected crystal rectifiers, said crystals being diposed end to end between opposite wide walls within said wave guide, means for providing an impedance match between said crystals and said wave guide, a coaxial transmission line extending centrally within said wave guide, the inner conductor of said coaxial line being connected to the junction between said crystals, a second coaxial transmission line, a coupling probe for capacitively coupling said first and second coaxial lines, means for adjusting the capacitance of said coupling means for coupling local oscillator energy into said second coaxial line, and means for filtering said local oscillator energy from said first coaxial line.

References Cited in the file of this patent

UNITED STATES PATENTS

| | | |
|---|---|---|
| 2,142,159 | Southworth | Jan. 3, 1939 |
| 2,408,420 | Ginzton | Oct. 1, 1946 |
| 2,410,122 | Mercer et al. | Oct. 29, 1946 |
| 2,514,678 | Southworth | Jan. 11, 1950 |